United States Patent [19]

Benjamin

[11] Patent Number: 4,649,528
[45] Date of Patent: Mar. 10, 1987

[54] OPTICAL PIN APPARATUS FOR MEASURING THE ARRIVAL TIME AND VELOCITY OF SHOCK WAVES AND PARTICLES

[75] Inventor: Robert F. Benjamin, 315 Rover Blvd., Los Alamos, N. Mex. 87544

[73] Assignee: Robert F. Benjamin, Los Alamos, N. Mex.

[21] Appl. No.: 542,958

[22] Filed: Oct. 18, 1983

[51] Int. Cl.$^4$ .......................................... H04R 23/00
[52] U.S. Cl. ..................................... 367/149; 367/191
[58] Field of Search ............... 367/149, 191; 376/103, 376/105, 106, 143, 152

[56] References Cited

PUBLICATIONS

"Nanosecond Hydrodynamic Diagnostics . . . " Proc. 12th International Congress on High Speed Photo., SPIE vol. 97, Aug. 1–7, 1976.
"New Measuring Use for Microballoons," Los Alamos News Bulletin, pp. 1 and 3, 8/83.
"Plasma Physics and Controlled . . . " Reprint, Int. Atomic Energy Agency, Vienna, 1975.
"Fabrication of Glass Microballoons . . . " VCRL-51609, 7/74.

Primary Examiner—Thomas H. Tarcza
Assistant Examiner—Ian J. Lobo
Attorney, Agent, or Firm—Samuel M. Freund

[57] ABSTRACT

An apparatus for the detection of the arrival and for the determination of the velocity of disturbances such as shock-wave fronts and/or projectiles. Optical pins using fluid-filled microballoons as the light source and an optical fiber as a link to a photodetector have been used to investigate shock-waves and projectiles. A microballoon filled with a noble gas is affixed to one end of a fiber-optic cable, and the other end of the cable is attached to a high-speed streak camera. As the shock-front or projectile compresses the microballoon, the gas inside is heated and compressed producing a bright flash of light. The flash of light is transmitted via the optic cable to the streak camera where it is recorded. One image-converter streak camera is capable of recording information from more than 100 microballoon-cable combinations simultaneously.

22 Claims, 3 Drawing Figures

OPTICAL PIN APPARATUS FOR MEASURING THE ARRIVAL TIME AND VELOCITY OF SHOCK WAVES AND PARTICLES

This invention is the result of a contract with the Department of Energy (Contract No. W-7405-ENG-36).

BACKGROUND OF THE INVENTION

The present invention relates generally to the measurement of the arrival time and velocity of shock waves and projectiles, and more particularly to the use of optical pins which include fluid-filled microballoons as a light source and an optical fiber as a link to a light detector.

An important diagnostic in hydrodynamic testing is the "pin," which detects the arrival of a shock-wave front or a high-velocity surface (i.e., a projectile) at a particular location. Used in an array, pins can be used to describe the time dependence of a hydrodynamic event in three spatial dimensions and in time. In the past, electrical pins have been widely used. An electrical pin is the insulated tip of an electrically charged cable. When a pressure pulse impinges upon the pin, the pin is caused to become electrically conducting, thereby causing a short in the cable which results in an electrical impulse to be transmitted from the pin to an electrical detector. This pulse records the time at which the pressure pulse reaches the location of the pin. A major disadvantage to electrical pins is their inherent sensitivity to electromagnetic noise, rendering measurements unreliable in harsh electrical environments. Moreover, the instrumentation required to record the electrical impulse is quite expensive.

Optical pins have been used in the past. Typically, bare optical fibers which produce an optical pulse in response to an impact by a shock front or projectile were employed. The optical pulse produced may be due to the luminosity of the shock front or due to pressure-induced luminosity. The latter effect often produces an optical pulse that is too dim for applications requiring subnanosecond time resolution and for applications where the only available streak camera is a rotating mirror design with inadequate sensitivity. Further, the duration of the optical pulse from the luminous fiber is too long for optimal recording by some instruments.

Flash gaps represent an alternative method to pin detection of shock-wave fronts producing an optical signal. Typically, a flash gap consists of a thin, gas-filled volume enclosed by a plastic envelope. The target gas is generally air, argon, or xenon. The rapid compression of the gas under the interaction with the impinging shock-wave front causes the gas to luminesce brightly. After the shock-wave traverses the gas and impinges upon the plastic envelope, the optical pulse is terminated. As a result the shock-wave produces a short pulse of light. Pulse duration is controlled by the thickness of the gas-filled volume; that is, the path through which the shock-wave front must traverse.

In "Nanosecond Hydrodynamic Diagnostics Using Fiber Optic Probes and a Streaking Camera," by L. L. Shaw, R. R. Donaldson, J. R. Murchie, and T. J. Ramos, Proceedings of the 12th International Congress on High Speed Photography (Photonics), Aug. 1-7, 1976, Toronto Canada, SPIE Vol. 97, pages 256–262, the authors describe an optical pin which includes a small closed space filled with xenon gas at a pressure of about 1 atm. However, the sensing end of the optical fibers taught by the authors is both sophisticated and complicated, making their pin apparatus expensive and difficult to place into service. Moreover, the gas fill pressure, which controls the sensitivity of the pin, cannot be varied. Indeed, the authors cannot measure the pressure of fill gas after the gas is loaded. Further, the thickness of the membrane which serves as a light shield cannot be substantially reduced in thickness. The use of a transparent microballoon as a pressure vessel to provide a flash gap which is detected by a photodetector via an optical fiber is not contemplated by this article.

SUMMARY OF THE INVENTION

Accordingly an object of the instant invention is to provide an apparatus for measuring the arrival time and the velocity of a shock-wave front or projectile.

Another object of the subject invention is to provide an apparatus for determining the arrival time and velocity of a shock-wave front or projectile in the presence of significant electromagnetic noise.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise at least one fluid-filled microballoon which is responsive to impinging shock-wave fronts or projectiles producing and emitting bright flashes of light therefrom, and means for quantitatively detecting the emitted light flash. Optical fiber means are provided for transmitting the emitted light from the fluid-filled microballoons to the light detection means the fluid-filled microballoons being attached thereto.

An opaque shield covers the microballoon/optical fiber assembly to protect the optical pin from any unwanted low-pressure pulses and stray light which precede the impinging shock-wave front or projectile, the shield being easily ruptured by the incident shock wave. Alternatively, an optically opaque coating can be applied to the exposed surface of the microballoon not in contact with light transmitting means. In a preferred embodiment of the present invention, the fluid-filled microballoons are filled with any of the noble gases, air or mixtures thereof. Preferably also, shutter means are provided for preventing the emitted bright flash of light from reaching the optical fiber after a selected time period, thereby permitting the velocity of the shock-wave front or projectile to be determined when more than one microballoon is attached to the optical fiber. In a preferred embodiment of the subject invention, the shutter means includes a section of transparent or translucent plastic rod located in between the microballoon and the optical fiber, whereby the plastic becomes opaque and non-transmitting after interacting with the incident shock-wave front or projectile. Preferably also, the microballoons are attached to the optical fibers with an adhesive having a refractive index in between the refractive index of the microballoon and that of the optical fiber, thereby more efficiently transmitting the emitted flash of light from the microballoon into the optical fiber.

The present invention may also comprise, in accordance with its objects and purposes, a plurality of serially disposed, spaced apart fluid-filled microballoons, each of which are responsive to an impinging shock-wave front or projectile, producing therefrom a bright flash of light, at least one transparent or translucent plastic optical fiber for receiving and transmitting the emitted bright flash of light, the optical fiber becoming opaque and non-transmitting upon interacting with the incident shock-wave front or projectile in a region in the vicinity of its interaction with the shock-wave front or projectile, thereby permitting the velocity of the impinging shock-wave front or projectile to be determined, the velocity being inversely proportional to the spacing between the microballoon flashes, an opaque shield which covers and protects the fluid-filled microballoons from any unwanted low-pressure pulses and stray light which precede the impinging shock-wave front or projectile, the shield being easily ruptured by the impinging shock-wave front or projectile, thereby exposing the fluid-filled microballoons to the interaction with the shock-wave or projectile, and means for receiving and detecting the emitted bright flash of light transmitted through the optical fiber.

Benefits and advantages achieved by the subject invention include the improvement in the quality of pin recordings while substantially decreasing the cost, and the feasibility of experiments where pin diagnostics are desirable but the use of electrical pins is unsatisfactory due to adverse electromagnetic noise environments.

The foregoing descriptions of the preferred embodiments of the invention have been presented for purposes of illustration and description. They are not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Reference will now be made in detail to the present preferred embodiment of the invention, an example of which is illustrated in the accompanying drawings.

Figure 1:
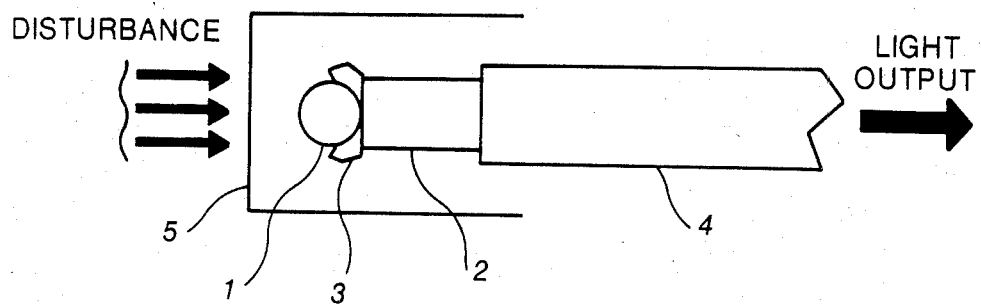
FIG. 1 is a schematic representation of the basic optical pin design for detecting the arrival of a shock-wave or particle.

Turning now to FIG. 1, a pressure disturbance or projectile, impinges upon an opaque shield 5. The shield prevents weak shocks from detonation waves, for example, from damaging the assembly before the principal impulse or projectile arrives, as well as preventing stray light from reaching the optical fiber. An opaque coating on the entire exposed surface of the microballoon not in contact with the optical fiber may be used as a stray light shield for some applications. Upon breaking through the opaque shield, the pressure disturbance or projectile can access the fluid-filled microballoon 1 which is fastened by means of an adhesive 3 to a transparent or translucent plastic (for example, polymethyl-/methacrylate) rod 2. The adhesive must also be transparent or translucent. It is chosen to have a refractive index between that of the microballoon and that of the plastic rod in order to efficiently transmit the light from the microballoon into the optical fiber 4. The plastic rod acts as a shutter. When this material is shocked, it becomes opaque and nontransmitting, thereby blocking the light emitted by the microballoon or any other light source from reaching the optical fiber. Plastic optical fibers can be used which quench the light in a similar fashion; in this event, the plastic rods may be omitted. For some applications, the light shuttering capability is unnecessary and can be omitted, the microballoons then being directly attached to the optical fiber.

The fluid-filled microballoon is the light source. Microballoons are tiny, hollow, gas-tight vessels which can be stably filled with a variety of gases and liquids. When the fluid contained therein is shock-heated it emits a bright pulse of light. Typically, a gas employed is one of the noble gases, or air, or a combination thereof. Liquids should also work quite well. The gas pressure is controlled during the filling process, and pressures up to 10 atmospheres of argon have been achieved in glass microballoons. The microballoons can be made of clear or translucent glass or plastic. The optical pulse is transmitted via the optical fiber to a photodetector such as a streak camera. Shock-heating is produced by compression of the microballoon by the shock-wave or particle which is transmitted to the fluid therein. Generally, microballoons have diameters of 0.04 mm to 1.0 mm. These sizes are compatible with the dimensions of optical fibers. The configuration shown in FIG. 1, when duplicated in a plurality of similar pins placed in precise locations and at precise angles within experiments in a similar manner to that which electrical pins are currently positioned, is suitable for obtaining a detailed profile of the incident shock-wave or high velocity surface. A large number of optical fibers can be used with a single streak camera. Such profiles can therefore now be obtained with a minimum of costly equipment. At only several times the cost of a single oscilloscope, one streak camera can record information equivalent to that recorded by more than 100 oscilloscopes if electrical pins were utilized. Photodiodes, photomultipliers, framing cameras, and scan converters may also be used to detect the light pulse or pulses.

Figure 2:
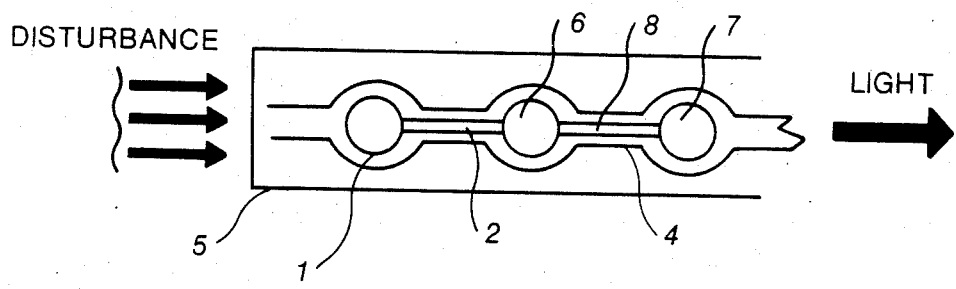
FIG. 2 is a schematic representation of a multi-microballoon optical pin for measuring the velocity of an incident shock-wave or particle.
Figure 3:
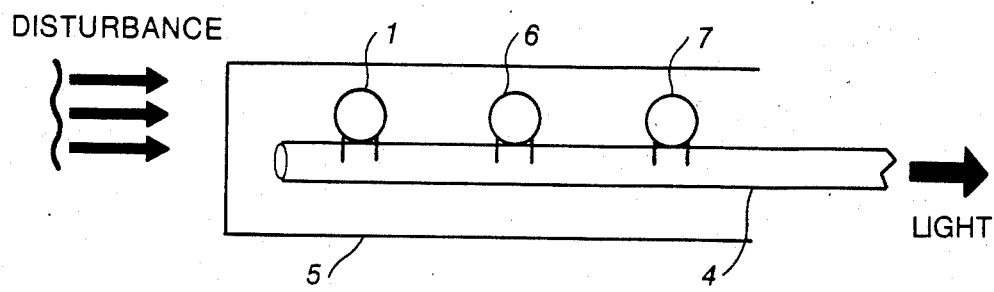
FIG. 3 is a schematic representation of an alternative multi-microballoon optical pin similar in function to the one shown in FIG. 2.

FIGS. 2 and 3, show pin assemblies useful for measuring the velocity of an impinging shock-wave or projectile in addition to its time of arrival. In FIG. 2, several fluid-filled microballoons 1, 6, and 7 are placed within a single optical fiber 4 for the purpose of sequentially measuring the arrival of such a shock-wave front. Plastic rods 2 and 8 are inserted between the microballoons to block the continued transmission of light from the emitting microballoons. In this manner, the light pulse emitted by each of the microballoons can be distinguished.

FIG. 3 shows another preferred embodiment of a multi-microballoon pin design for detecting both the arrival and the velocity of a shock-wave front or projectile. Here the microballoons are attached to the side of the optical fiber. For some applications, the microballoons in FIG. 3 can be displaced from the principal transmitting optical fiber by interposing optical fibers. That is, a plurality of assemblies of the embodiment described in FIG. 1 are connected to a single collecting optical fiber which transmits the optical signals derived therefrom to the detector means. In a similar manner to the single microballoon pin described in FIG. 1, a plurality of the multi-microballoon pin assemblies shown in FIGS. 2 and 3 can be placed in precise locations to sample the nature of the profile of the incident shock-wave or projectile.

As an example of the reduction to practice of the subject invention, signals produced by 14 gas-filled microballoon optical pins during a test firing of a coaxial, magnetic flux-compression generator have been simultaneously recorded on a single streak camera. This data has been reduced to determine the hydrodynamic interaction between the stator and armature of the generator. This streak record is the first test of microballoon optical pins in a harsh electromagnetic environment.

The present invention, then, is an optical pin, or an array thereof, which includes one or more fluid-filled microballoons, an opaque shield, a shutter, and an optical link to a photodetector. Advantages of the optical pin array of the subject invention over an electrical pin array include:

1. Optical pins are far less susceptible to electromagnetic noise and to ionizing radiation;

2. Optical signals can be recorded at far lower cost than electrical signals because optical recording using a streak camera is considerably less costly per channel than electrical recording where one oscilloscope or transient digitizer is required for one or several channels;

3. Optical signals can be detected with better time resolution than electrical signals; that is, commercially available, image converter streak cameras attain a time resolution of a few picoseconds compared with several hundred picoseconds time resolution for state of the art oscilloscopes;

4. The complete diagnostic system based on optical pins can be nondestructively tested immediately before its use on an event; that is, one can simply remove the opaque shields, produce a light flash from a xenon flash lamp, for example, near the tips, and verify that the photodetector records the information. Electrical pin systems, however, cannot be similarly nondestructively tested; and 5. An electrical pin requires a power supply to charge a cable, while optical pins are passive; that is, they require no power supply to the pins.

The placement of a shock-sensitive light emitting gas at the tip of an optical fiber has the advantage that the emitted light intensity is much greater than the light emitted from the shocked fiber itself. Among the advantages of containing the gas in microballoons, as taught by the present invention, are the control of gas pressure, the ease of fabrication, and the improvement in time resolution. The containment procedure described by Shaw et al., supra, only permits approximately one atmosphere of gas to be reproducibly sealed, whereas argon-filled glass microballoons have been filled to 10 atmospheres, and higher pressures are possible. The importance of filling the vessel to higher pressures is that the brightness of the flash increases with increasing pressure up to some optimum pressure. The filling of microballoons and their attachment to fragile structures is a routine procedure due to developments in the fabrication of laser-fusion targets, whereas the method described in the Shaw et al. reference requires considerable development. Moreover, separating the functions of filling a vessel and then attaching that vessel to the fiber avoids the potential difficulties of having contact between the gas and the optical fiber; that is, difficulties of permeability or leakage into the fiber. The time resolution of the system described by Shaw et al. is 1-2 nanoseconds, whereas the microballoon system is likely to have subnanosecond resolution due to the convergence effects of the spherical balloon and the small overall dimensions. Finally, the assemblies described in the present invention can be used in the same manner as electrical pins are currently positioned, whereas more conventional flash-gaps are much more bulky.

Potential industrial applications include oil, gas and mineral recovery, demolition where explosives are used, explosive-driven devices, such as shaped charges, projectiles and other armaments. Moreover, the subject apparatus will be useful for diagnosing high speed machinery such as turbines and flywheels.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments are chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optical pin which comprises in combination:
    a. at least one fluid-filled microballoon, said fluid-filled microballoon being responsive to an impinging shock-wave front and producing and emitting a bright flash of light therefrom;
    b. opaque shield means for protecting said at least one fluid-filled microballoon from any low-pressure pulses and stray light which precede the impinging shock-wave front, said shield being easily ruptured by the impinging shock-wave front, thereby exposing said at least one fluid-filled microballoon to the impinging shock-wave front;
    c. means for quantitatively detecting said emitted flash of light; and
    d. optical fiber means for transmitting the flash of light to said quantitatively detecting means.

2. The optical pin as described in claim 1, wherein said fluid-filled microballoon is filled with a gas selected from the group consisting of the noble gases and mixtures thereof.

3. The optical pin as described in claim 2, wherein shutter means are provided for preventing the emitted flash of light from said at least one fluid-filled microballoon from reaching said optical fiber after a selected time period, thereby permitting the velocity of the shock-wave front to be determined when a plurality of said at least one fluid-filled microballoons are affixed to said optical fiber and the recording of more than one event on a single recording channel to be made.

4. The optical pin as described in claim 3, wherein said shutter means includes a section of light transmitting plastic rod disposed between said fluid-filled microballoon and said optical fiber, whereby said plastic rod becomes opaque and non-transmitting after interacting with the impinging shock-wave front.

5. The optical pin as described in claim 4, wherein said at least one fluid-filled microballoon is attached to said optical fiber with an adhesive having a refractive index in between the refractive index of said microballoon and the refractive index of said fluid-filled optical fiber, thereby more efficiently transmitting the emitted flash of light from said at least one fluid-filled microballoon into said optical fiber.

6. The optical pin as described in claim 2, wherein said optical fiber is fabricated from light transmitting plastic, said plastic fiber becoming opaque and non-transmitting after interacting with the impinging shock-wave front in the vicinity of the region of interaction, thereby acting as a shutter for the emitted flash of light, whereby the velocity of said shock-wave front can be determined when more than one of said at least one fluid-filled microballoon is affixed to said optical fiber and more than one event can be recorded in a single recording channel.

7. An apparatus for detecting the arrival of a shock-wave front which comprises in combination:
  a. at least one fluid-filled microballoon, said at least one fluid-filled microballoon being responsive to the impinging shock-wave front and producing and emitting a bright flash of light therefrom;
  b. opaque shield means for protecting said at least one fluid-filled microballoon from any low-pressure pulses and stray light which precede the impinging shock-wave front, said shield being easily ruptured by the impinging shock-wave front, thereby exposing said at least one fluid-filled microballoon to the impinging shock-wave front;
  c. means for quantitatively detecting the emitted flash of light; and
  d. optical fiber means for transmitting the emitted flash of light from said at least one fluid-filled microballoon to said flash of light detection means.

8. The apparatus as described in claim 7, wherein said at least one fluid-filled microballoon is filled with a gas selected from the group consisting of the noble gases and mixtures thereof.

9. The apparatus as described in claim 8, wherein shutter means are provided for preventing the emitted flash of light from said at least one fluid-filled microballoon from reaching said optical fiber after a selected time period, thereby permitting the velocity of the shock-wave front to be determined when a plurality of said at least one fluid-filled microballoons are affixed to each of said optical fibers and the recording of more than one event on a single recording channel to be made.

10. The apparatus as described in claim 9, wherein said shutter means includes a section of light transmitting plastic rod disposed between said at least one fluid-filled microballoon and said optical fiber, whereby said plastic rod becomes opaque and non-transmitting after interacting with the impinging shock-wave front.

11. The apparatus as described in claim 10, wherein said at least one fluid-filled microballoon is attached to said optical fiber with an adhesive having a refractive index in between the refractive index of said at least one fluid-filled microballoon and the refractive index of said optical fiber, thereby more efficiently transmitting the emitted flash of light from said at least one fluid-filled microballoon into said optical fiber.

12. The apparatus as described in claim 8, wherein said optical fiber is fabricated from light transmitting plastic, said plastic fiber becoming opaque and non-transmitting after interacting with the impinging shock-wave front in the vicinity of the region of interaction, thereby permitting the velocity of the shock-wave front to be determined when more than one of said at least one fluid-filled microballoons are affixed to said optical fiber and the recording of more than one event on a single recording channel to be made.

13. An optical pin for determining the time of arrival and the velocity of an impinging shock-wave front, said optical pin comprising in combination:
  a. a plurality of serially disposed, spaced-apart fluid-filled microballoons, each of said fluid-filled microballoons being responsive to the impinging shock-wave front and producing and emitting a bright flash of light therefrom, there being a first fluid-filled microballoon and a last fluid-filled microballoon in said plurality thereof;
  b. at least one light transmitting plastic rod section interposed in optical contact between said fluid-filled microballoons, said first fluid-filled microballoon and said last fluid-filled microballoon each being in optical contact with only one of said plastic rod sections, said rod sections becoming opaque and non-transmitting after interacting with the impinging shock-wave front, thereby permitting the velocity of the impinging shock-wave front to be determined, the velocity being inversely proportional to the length of said plastic rod section;
  c. at least one optical fiber for receiving and transmitting said emitted flash of light, one end of said optical fiber being in optical contact with said last fluid-filled microballoon;
  d. opaque shielding means which covers and protects said fluid-filled microballoons from any low-pressure pulses and stray light which precede the impinging shock-wave front, said shield being easily ruptured by the impinging shock-wave front thereby exposing said fluid-filled microballoons to the impinging shock-wave front; and
  e. means for receiving and detecting said emitted flash of light transmitted through said optical fiber.

14. An optical pin for determining the time of arrival and velocity of an impinging shock-wave front, said optical pin comprising:
  a. a plurality of serially disposed, spaced apart fluid-filled microballoons, each of said fluid-filled microballoons being responsive to the impinging shock-wave front and producing and emitting a bright flash of light therefrom;
  b. at least one light transmitting plastic optical fiber for receiving and transmitting said emitted flash of light, at least one of said fluid-filled microballoons being attached to the side thereof, said optical fiber becoming opaque and non-transmitting upon interacting with the impinging shock-wave front in a region in the vicinity of the region of interaction, thereby permitting the velocity of the impinging shock-wave front to be determined, the velocity being inversely proportional to the spacing between said fluid-filled microballoons;

c. opaque shielding means which covers and protects said fluid-filled microballoons from any low-pressure pulses and stray light which precede the impinging shock-wave front, said shield being easily ruptured by the impinging shock-wave front thereby exposing said fluid-filled microballoons to the impinging shock-wave front; and d. means for receiving and detecting said emitted flash of light transmitted through said optical fiber.

15. An optical pin which comprises in combination:
a. at least one fluid-filled microballoon, said at least one fluid-filled microballoon being responsive to an impinging particle and producing and emitting a bright flash of light therefrom;
b. means for quantitatively detecting the emitted flash of light;
c. optical fiber means for transmitting the emitted flash of light from said at least one fluid-filled microballoon to said flash of light detection means; and
d. opaque shielding means for protecting said at least one fluid-filled microballoon from any low-pressure pulses and stray light which precedes the impinging particle, said opaque shielding means being easily ruptured by the impinging particle, thereby exposing said at least one fluid-filled microballoon to the impinging particle.

16. The optical pin as described in claim 15, wherein said at least one fluid-filled microballoon is filled with a gas selected from the group consisting of the noble gases and mixtures thereof.

17. The optical pin as described in claim 16, wherein shutter means are provided for preventing the emitted flash of light from said at least one fluid-filled microballoon from reaching said optical fiber after a selected time period, thereby permitting the velocity of the impinging particle to be determined when a plurality of said at least one fluid-filled microballoons are affixed to said optical fiber and the recording of more than one event on a single recording channel to be made.

18. The optical pin as described in claim 17, wherein said shutter means includes a section of light transmitting plastic rod disposed between said at least one fluid-filled microballoon and said optical fiber, whereby said plastic rod becomes opaque and non-transmitting after interacting with the impinging particle.

19. The optical pin as described in claim 18, wherein said at least one fluid-filled microballoon is attached to said optical fiber with an adhesive having a refractive index in between the refractive index of said at least one fluid-filled microballoon and the refractive index of said optical fiber, thereby more efficiently transmitting said emitted flash of light from said at least one fluid-filled microballoon into said optical fiber.

20. The optical pin as described in claim 16, wherein said optical fiber is fabricated from light transmitting plastic, said plastic fiber becoming opaque and non-transmitting after interacting with the impinging particle in the vicinity of the region of interaction, thereby acting as a shutter for the emitted flash of light, whereby the velocity of said particle can be determined when more than one of said at least one fluid-filled microballoons are affixed to said optical fiber and more than one event can be recorded on a single recording channel.

21. An apparatus for detecting the arrival of a shock-wave front which comprises in combination:
a. at least one fluid-filled microballoon, said at least one fluid-filled microballoon being responsive to an impinging shock-wave front and producing and emitting a bright flash of light therefrom; and
b. means for quantitatively detecting the emitted flash of light;
c. optical fiber means for transmitting the emitted flash of light from said at least one fluid-filled microballoon to said flash of light detection means; and
d. an opaque coating covering the entire exposed surface of said at least one fluid-filled microballoon for protecting said at least one fluid-filled microballoon from stray light preceding the impinging particles, said opaque coating being easily ruptured by the impinging shock-wave front.

22. An optical pin which comprises in combination:
a. at least one fluid-filled microballoon, said at least one fluid-filled microballoon being responsive to an impinging particle and producing and emitting a bright flash of light therefrom; and
b. means for quantitatively detecting the emitted flash of light;
c. optical fiber means for transmitting the emitted flash of light from said at least one fluid-filled microballoon to said flash of light detection means; and
d. an opaque coating covering the entire exposed surface of said at least one fluid-filled microballoon for protecting said at least one fluid-filled microballoon from stray light preceding the impinging particles, said opaque coating being easily ruptured by the impinging particle.

* * * * *